United States Patent [19]

Krishnan

[11] Patent Number: 4,534,043

[45] Date of Patent: Aug. 6, 1985

[54] TEST TONE DETECTOR APPARATUS AND METHOD MODEM USING SAME

[75] Inventor: Vedavalli G. Krishnan, Miami Lakes, Fla.

[73] Assignee: Racal Data Communications, Inc., Miami, Fla.

[21] Appl. No.: 508,103

[22] Filed: Jun. 27, 1983

[51] Int. Cl.³ .................. G06F 15/31; H04M 1/50
[52] U.S. Cl. ................ 375/104; 340/825.48; 364/724
[58] Field of Search ............... 370/110.3; 455/35, 36; 179/84 R, 84 VF; 340/825.44, 825.48, 825.71; 375/5, 75, 104; 328/138; 307/510, 516; 364/183, 724, 725; 329/104, 107

[56] References Cited

U.S. PATENT DOCUMENTS

| | | | |
|---|---|---|---|
| 3,046,345 | 7/1962 | Harris et al. | 370/110.3 |
| 3,544,723 | 12/1970 | Battista | 370/110.3 |
| 3,878,468 | 4/1975 | Falconer et al. | 375/15 |
| 3,919,653 | 11/1975 | LeMouel | 329/104 |
| 3,947,768 | 3/1976 | Desblache et al. | 375/15 |
| 3,962,645 | 6/1976 | Stewart | 455/35 |
| 3,970,946 | 7/1976 | Matsuo | 329/104 |
| 3,999,138 | 12/1976 | Peil et al. | 329/2 |
| 4,142,177 | 2/1979 | Davis | 329/107 |
| 4,203,070 | 5/1980 | Bowles et al. | 375/94 |
| 4,302,817 | 11/1981 | Labedz | 455/35 |
| 4,438,504 | 3/1984 | Favin | 364/724 |
| 4,455,617 | 6/1984 | Dolikian | 364/724 |
| 4,468,794 | 8/1984 | Waters | 364/724 |

Primary Examiner—Benedict V. Safourek
Attorney, Agent, or Firm—Cushman, Darby & Cushman

[57] ABSTRACT

The presence of a predetermined pure sinusoidal signal is detected by periodically sampling the actual value of an input electrical signal and, based thereon, predicting what the expected value of the sinusoid would be at a next sampling instant if it is present. The actual and predicted future input signal values are then compared and a running average signal of the thus detected errors in predictions over plural such sampling and prediction cycles are compared to a preset threshold signal value to detect the presence of the predetermined tone. A modem receiver is turned off in the exemplary embodiment when the predetermined test tone is detected to prevent false data or "garbage" being output therefrom.

8 Claims, 5 Drawing Figures

TEST TONE DETECTOR APPARATUS AND METHOD MODEM USING SAME

This application is generally directed to apparatus and method for detecting the presence of a predetermined electrical signal having a predetermined and predictable waveshape (e.g. a single frequency sinusoid). The application is also directed to a digital data modem capable of conveniently utilizing such detector apparatus and method.

Digital data modems for modulating digital data bearing information onto carrier signals for transmission over telephone lines or other transmission media and for demodulating received encoded signals of that sort are well known in the art. It is also well known in the art to transmit various auxiliary test or other tones before, in the course of, or after encoded digital data transmissions. For example, in one type of modem a test tone of approximately 1,004 Hz is used for testing the transmission line prior to data transmission. It has been observed that a tone may be perceived by the receiver as an incoming data signal and thus be stimulated to produce false or pseudo data output which is sometimes termed "garbage".

To avoid this possible problem, it is now proposed to incorporate a switch into the modem receiver so as to turn the receiver off whenever the pure single frequency test tone is detected as the only signal present on the transmission medium.

While there are a great number of prior art techniques that may be utilized for detecting sinusoidal tones of a given frequency, many of them may require relatively expensive, bulky, complex and/or precise analog filter circuits (especially when fairly low audio frequencies are involved and the detection process is desired to be fairly accurate) or otherwise add to the expense, bulk, complexity, etc. of the existing modem device which is to be controlled. However, I have now discovered a novel tone detector apparatus and method which conveniently takes advantage of already existing analog and digital circuitry within many digital data modems. Accordingly, by using this novel tone detector apparatus and method, it is possible to incorporate the desired receiver disablement function into an existing modem with relatively few modifications.

And there may be other applications for this signal detector apparatus and method.

Although the exemplary embodiment is especially adapted for the detection of a pure or single frequency sinusoid signal, it may be possible to utilize the general principles here taught so as to detect the presence of other predetermined electrical signals having predetermined and predictable waveshapes.

In brief summary, the method and apparatus of this invention periodically generates an expected future value of an input signal assumed to be of some predetermined and predictable waveshape based upon a quantitatively measured instantaneous past value of the actual input signal. The actual input signal occurring at the predicted future time is then compared with the predicted future signal value at that time to generate an error signal related to the difference between the predicted and actual values. As should be appreciated, if the predetermined predictable waveshape to be detected is the only input signal component, then this error should be very small or perhaps nonexistent. However, since this small error condition might occur from time to time as a matter of mere chance regardless of the input signal waveshape, a running average of these errors is maintained and compared to a predetermined threshold value to generate a more reliable detection output signal indicating the detected presence of the predetermined predictable waveshape.

Since modern day digital data modems typically already sample the incoming analog signal, convert it to digital form and perform most subsequent demodulation processes thereafter in a microprocessor-based digital data processing system, the general methodology just outlined can be quite easily and conveniently implemented in digital form in such a modem to controllably disable the modem receiver from delivering pseudo data or garbage when pure test tones or the like are present on the transmission medium.

Furthermore, this invention is particularly suited for such a modem environment because the signal measurements and predictions may be made at any time when the existing modem data processor has available time to perform the prediction process and to increment the running average. Although it would thus be possible to arrange for the prediction signals to be generated at irregular intervals (or otherwise to allocate available data processor time to the tone detection functions), in the preferred exemplary embodiments, the tone detection functions are associated with regular signal sampling intervals albeit the tone detection processes are executed at a much lower rate than the Nyquist sampling frequency typically used by the modem for extracting encoded digital data and the like.

Still further, it is possible to execute the tone detection functions at a much lower rate than even the tone frequency to be detected. However, in the preferred exemplary embodiment, the tone detection process is executed at a fairly high rate so as to achieve a fairly quick tone detection and receiver disablement response. Lower tone detection execution rates would degrade the response time of the detector.

The signal detector of this invention is particularly adapted for digital data modems because it makes use of digitized received signal data typically already computed and stored by the modem for other purposes. In the presently preferred exemplary embodiment, the tone detector also uses the phase-splitter output typically already present within the modem. This permits the use of quadrature phase signal component values in complex arithmetic calculations used to determine an error without possible phase ambiguities. It is believed that the use of such quadrature information in the process may provide an advantage under certain circumstances (e.g. when attempting to detect tones of relatively higher frequencies) where the added information provided by vector error measurements as opposed to scalar error measurements may provide added discrimination abilities.

These as well as other objects and advantages of this invention will be better appreciated by study of the following detailed description of the presently preferred exemplary embodiments of this invention taken in conjunction with the accompanying drawings, of which.

Figure 1:
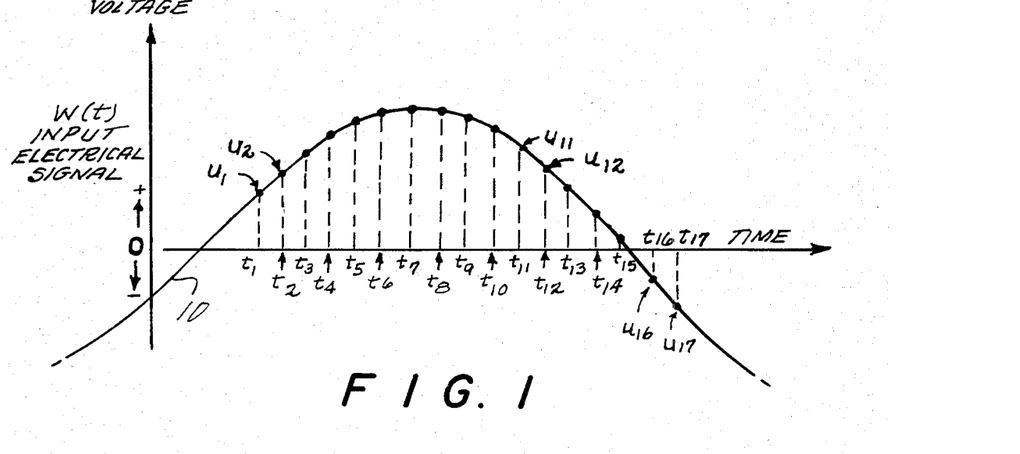
FIG. 1 is a drawing of a predetermined predictable (sinusoidal) waveform useful in explaining the exemplary embodiment of this invention.
Figure 2:
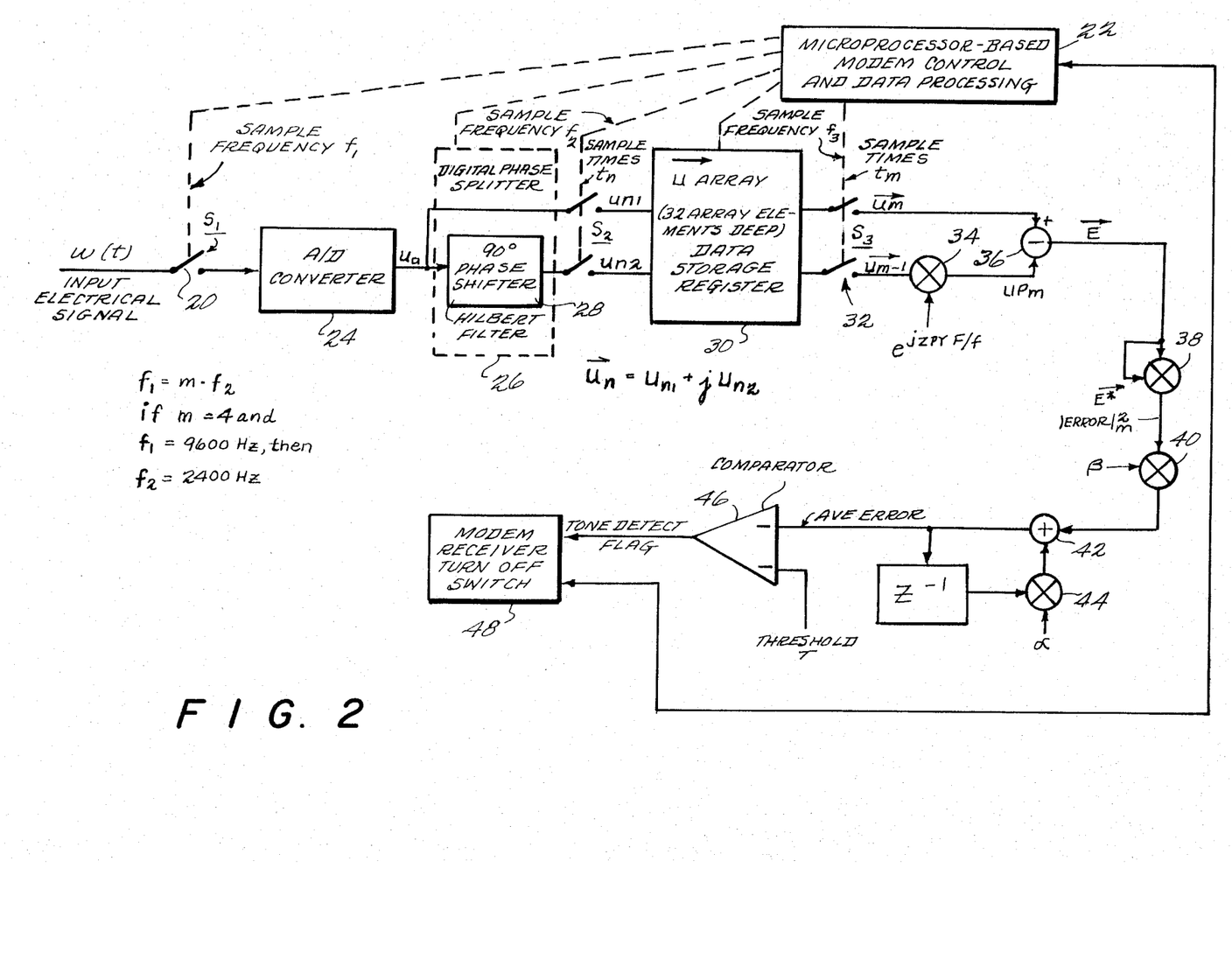
FIG. 2 is a schematic depiction of an exemplary tone detector which functions in accordance with this invention as embodied within a microprocessor-based digital data modem of otherwise conventional design.

A segment of a sinusoidal input electrical signal W(t) in terms of voltage (or current) versus time is depicted at 10 in FIG. 1. As will be appreciated by those in the art, conventional digital data modems typically sample an analog input signal 10 at successive intervals $t_1, t_2, t_3 \ldots t_n$, etc. as depicted by dotted lines extending from spaced positions along the time scale in FIG. 1. This sampling is accomplished, for example, by a first sampler $S_1$ shown in FIG. 2 which produces samples $U_0$. This basic sampling rate of the modem is chosen to be at least equal to if not greater than the Nyquist frequency (i.e. at least twice the highest frequency component to be detected in a received analog signal) especially where digital Hilbert filters are to be employed. The magnitude of the signal 10 at each sampling instant is typically converted to a digital form electrical signal and stored or otherwise subsequently processed in this digital form. A phase-splitter is used in the data acquisiton process and the value of the input electrical signal at each sampling instant produced by sampler $S_2$ is complex-valued and thus represented by vectors $\overline{U}_n$ with $\overline{U}_n = U_{n1} + jU_{n2}$ as also depicted in FIG. 2. The phase-splitter sampling frequency $f_2$ is at the modem's baud rate.

In brief overview, the exemplary embodiment of this invention performs a tone detection process by use of a third sampler $S_3$ operating at frequency $f_3$ which, in the exemplary embodiment, samples once each 16 baud time samples. For each such tone detect time $t_m$, the just preceding actual signal sample $\overline{U}_{m-1}$ is used to compute the expected signal value $\overline{UP}_m$ at the tone detect time $t_m$. This computed expected value is then compared to the actual measured value taken at the tone detect time $t_m$ to derive a digital error signal. A running average of such error signals is then maintained and compared to a predetermined threshold value. Whenever the running average of the error signals falls below the threshold value, a tone detect flag is set and the modem receiver is turned off so as to avoid the output of erroneous pseudo data or garbage. As should be appreciated, the tone detect functions just described need not be performed in real time at precisely the times $t_m$—although the responsiveness of the detection function will be enhanced if the tone detect functions are promptly performed near time $t_m$ when all the necessary data is first available.

As shown in FIG. 2, the input electrical signal W(t) is typically sampled by the first sampler $S_1$ at frequency $f_1$ under control of the microprocessor-based modem control and data processing circuits 22. The resulting analog signal sample is typically converted by a conventional analog-to-digital signal converter 24. It is also conventional to include a digital phase splitter 26 so as to provide a pair of quadrature phase related digital output signals $U_{n1}$ and $U_{n2}$ at each baud sample time $t_n$ of second sampler $S_2$ which occur at sample frequency $f_2$—and all of which conventionally occur under control of the microprocessor-based modem control and data processing circuits 22. The 90° or quadrature phase shift between the digital samples $U_{n1}$ and $U_{n2}$ of the actual input electrical signal may be generated wholly within one channel by 90° phase shift circuit 28 or partially in each channel (e.g. with −45° phase shift in one channel and +45° phase shift in the other channel) or, alternatively, the phase splitter may be implemented in analog form prior (as shown in U.S. Pat. No. 3,878,468) to the analog-to-digital converter 24 (which would probably be provided after sampler $S_2$ in each of two channels in that case and eliminate the first sampler $S_1$ as should be appreciated). The digital phase splitter 26 may be of conventional design (e.g. as depicted in U.S. Pat. No. 3,947,768).

As depicted in FIG. 2, the instantaneous value (e.g. voltage or current) of the input signal W(t) is thus stored in vector form $\overline{U}_n = U_{n1} + jU_{n2}$ at each baud sample time $t_n$ in a data storage register 30, also conventionally present in the modem. For example, in the exemplary embodiment, it is assumed that the data storage register 30 is of sufficient size to store an array of the last 32 $\overline{U}$ vectors. However, since only the present vector $\overline{U}_n$ and the just previous vector $\overline{U}_{n-1}$ are needed for this tone detection process, the register could be correspondingly reduced if only tone detection functions are to be performed. The contents of the data storage register 30 are, as indicated in FIG. 2, available to the microprocessor-based modem control and data processing circuits 32 for use in conventional demodulation processes. Accordingly, all of the circuits so far described in FIG. 2 are those typically already available in conventional digital data modems of the digital microprocessor-based type.

Figure 5:
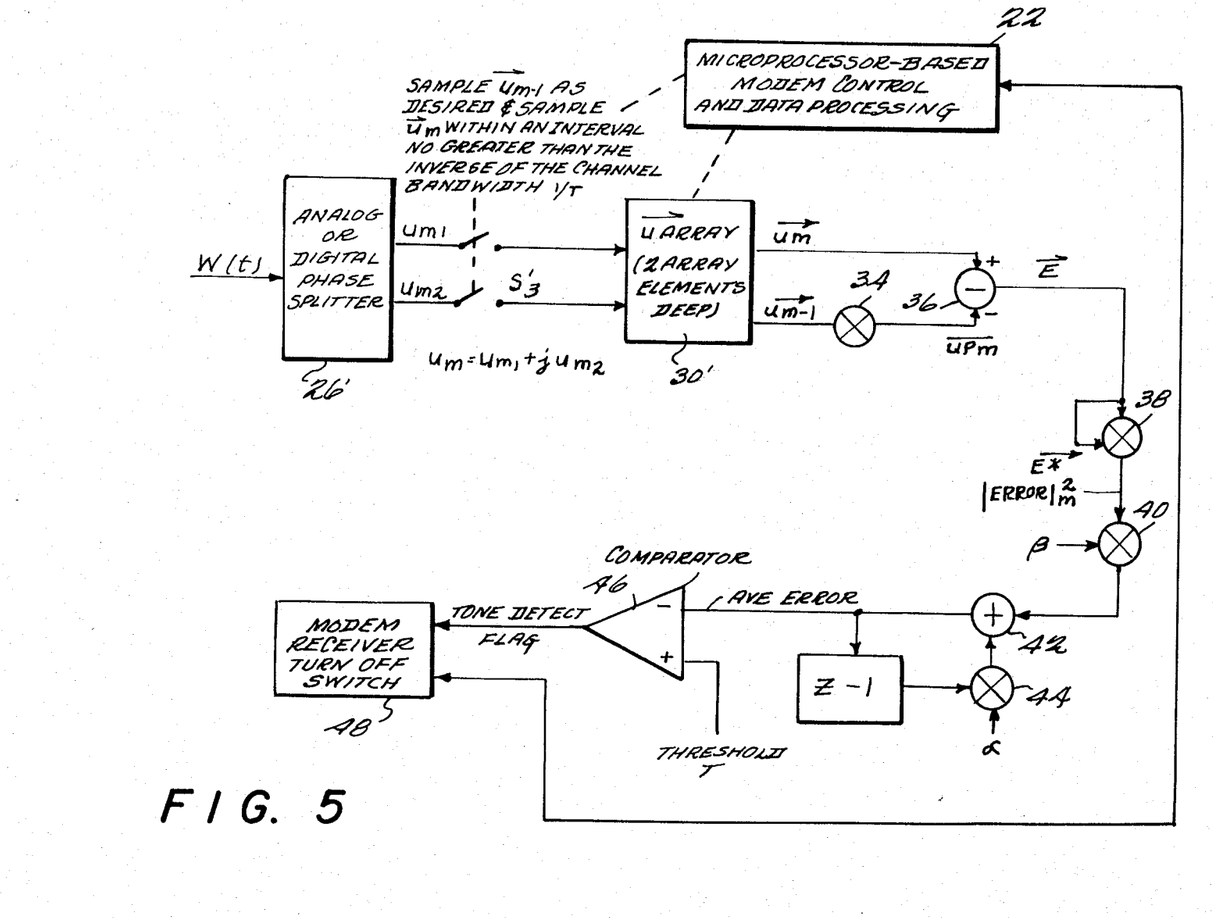
FIG. 5 is a simplified depiction of the FIG. 2 embodiment showing how it might be more simply implemented outside the environment of a digital modem which, for other purposes, already samples and digitizes the incoming signal.

Actually, the pair of samplers $S_1$ (operating at 9600 Hz in the exemplary embodiment) and $S_2$ (operating at 2400 Hz in the exemplary embodiment) are included and known only because they are already present in a typical digital modem of this type. A tone detector, per se, in accordance with this invention can be simplified with respect to the sampling process as depicted in FIG. 5. As depicted in FIG. 5, one may sample $\overline{U}_{m-1}$ whenever it is desired to do so (periodically or aperiodically). However, to have a unique tone detection in a particular bandwidth, the predicted tone samples should follow within an interval no greater than the inverse of the bandwidth. For example, if the baud rate is 1/T, this is also typically about equal to the channel bandwidth. Thus the predicted sample value should follow the actually measured sample value (or which it is based) by no more than T seconds if a unique tone detection within a 1/T bandwidth is desired.

As will be appreciated by those in the art, the microprocessor-based modem control and data processing circuits 22 also typically include the usual data storage elements (e.g. ROM for program control storage and the like, and RAM for variable input/output/intermediate result data, etc.) conventionally associated with a microprocessor CPU for performing desired manipulation of digital signals in accordance with a stored program. In the presently preferred exemplary embodiment, these already present microprocessor CPU, ROM and RAM elements are also utilized to perform the tone detection functions. However, such functions could be performed otherwise and also in accordance with the schematic depiction forming the remainder of FIG. 2.

To understand the tone detecting process of this invention, it is first useful to show the derivation of the prediction process based upon use of the already present data samples $U_{n1}$ and $U_{n2}$ successively output from the phase splitter 26 and stored in the data storage register 30. As will be shown, the derived expression is also a function of the second sampling frequency $f_2$ and the tone frequency F to be detected. Using this derived relationship, the expected value of the input signal at a given sample time is generated from the actual measured signal value at the just previous sampling interval. This expected value is then compared to the actual received and measured sample value. In the present exemplary embodiment, the squared absolute value of the measured error vector is subsequently averaged (e.g. a running average over a predetermined interval of time) and compared to a predetermined threshold value. If the error is less than the threshold, then a tone detect flag is set indicating that the input signal has been detected as constituting the predetermined single frequency sinusoid test tone.

The derivation begins with noting that if the input is the desired pure tone, then:

$$\overline{U}(t) = Ae^{j2\pi Ft} = A\cos(2\pi Ft) + jA\sin(2\pi Ft) \quad \text{(Equation 1)}$$

where
A = tone signal peak amplitude
F = frequency of pure sinusoidal tone to be detected
t = the usual continuous time variable
The phase-splitter output is sampled at successive time intervals $t_n$ $$\overline{U}_n = Ae^{j2\pi Fnt} = e^{j2\pi nF/f} \quad \text{(Equation 2)}$$

and $$\overline{U}_{n+1} = Ae^{j2\pi F/f} \cdot e^{j2\pi nF/f} \quad \text{(Equation 3)}$$
$$= [\cos(2\pi F/f) + j\sin(2\pi F/f)]\overline{U}_n$$

If one defines $\overline{U}_n = U_{n1} + jU_{n2}$ and the quantity $Q = 2\pi F/f$, then $$\overline{U}_{n+1} = [\cos(Q) + j\sin(Q)]\overline{U}_n \quad \text{(Equation 4)}$$
$$= [\cos(Q) + j\sin(Q)][U_{n1} + jU_{n2}]$$

Therefore, when the pure sinusoidal tone of frequency F is present, the predicted vector $\overline{UP}$ components $UP_{(m+1)1}$ and $UP_{(m+1)2}$ are given in terms of the just previous actual sample values:

$$UP_{(m+1)1} = U_{m1}\cos(Q) - U_{m2}\sin(Q) \quad \text{(Equation 5)}$$

$$UP_{(m+1)2} = U_{m1}\sin(Q) + U_{m2}\cos(Q) \quad \text{(Equation 6)}$$

In operation, $\overline{U}_n$ is stored in a 32 element deep buffer 30. At any tone detect execution time $t_m$, the just previous sampled vector $\overline{U}_{m-1}$ is used to calculate the predicted vector value $\overline{UP}_m$ which should have occurred at time $t_m$ if the pure tone of frequency F was present at the input. For example, the expected vector values could be calculated in accordance with the following formulas:

$$\overline{UP}_m = UP_{m1} + jUP_{m2}, \text{ and} \quad \text{(Equation 7)}$$

$$UP_{m1} = U_{(m-1)1}\cos(Q) - U_{(m-1)2}\sin(Q) \quad \text{(Equation 8)}$$

$$UP_{m2} = U_{(m-1)1}\sin(Q) + U_{(m-1)2}\cos(Q) \quad \text{(Equation 9)}$$

The absolute value of the error difference vector between the complex predicted and actual vector values is then:

$$|\text{Error}|^2_m = [U_{m1} - UP_{m1}]^2 + [U_{m2} - UP_{m2}]^2 \quad \text{(Eq. 10)}$$

A running average error E is, in this exemplary embodiment, then updated after each execution of the tone detection procedure:

$$E_m = \alpha E_{m-1} + \beta |\text{Error}|^2_m$$

The parameters $\alpha$ and $\beta$ are chosen in the exemplary embodiment to approximate a running average of the type that might be maintained by an RC integrating circuit in an analog circuit. For example, $\alpha$ may be a relatively large value less than one (e.g. 63/64) while $\beta$ may be a relatively small value less than one (e.g. 1/32). As will be appreciated, the larger $\beta$ is made and the smaller $\alpha$ is made, the quicker the running average will tend to assume the new error values and the response time of the detector will be reduced. However, false detections may result if the response time is made too short.

The error detection process just described is executed in the exemplary embodiment once every 16 samples of sampler $S_2$. That is, in the exemplary embodiment, the pair of $\overline{U}$ vectors involved in the various computations are, for example, $(\overline{U}_{m-1}, \overline{U}_m)$; $(\overline{U}_{m+15}, \overline{U}_{m+16})$; $(\overline{U}_{m+31}, \overline{U}_{m+32})$; etc. If more computation time is available, then addtional prior U vectors can be used (e.g. $\overline{U}_{m-2}, \overline{U}_{m-3}$, etc.) to make the prediction $\overline{UP}_m$.

The average error E is then compared against a predetermined threshold signal value T to determine whether the tone detect flag should be set. In the exemplary embodiment, the threshold is desired to have a value such that it would allow approximately a $\pm 10$ Hz variation in the 1,004 Hz tone to be detected while also permitting the usual existence of typical line noise. A computer simulation program is attached hereto as Appendix I as are exemplary outputs from the program illustrating detection of a 1,004 Hz tone (Appendix II) and a 1,700 Hz tone (Appendix III). As shown thereon, a threshold T value of about 0.028 might suffice plus some allowance for the anticipated noise for a particular application.

One exemplary implementation of the methodology just described is depicted at FIG. 2 which also suggests the form that a hard-wired implementation might take. There, for example, at a sample frequency $f_3 = f_2/16$ and at corresponding sample times $t_m$, the tone detection procedure is periodically initiated by closing switches 32 of sampler $S_3$ under control of circuits 22. As depicted in FIG. 2, at such sample time $t_m$, the corresponding actual measured vector values $\overline{U}_m$ and the just previous actual vector $\overline{U}_{m-1}$ are retrieved from the data storage register 30. The earlier measured vector $\overline{U}_{m-1}$ is then multiplied at 34 by the factor $e^{j2\pi F/f}$ so as to rotate vector $\overline{U}_{m-1}$ in the complex plane by the appropriate amount so as to produce a predicted vector $\overline{UP}_m$ at the output of multiplier 34. As should be appreciated, this is the vector $\overline{U}_m$ value that is expected at time $t_m$ if the pure sinusoidal tone to be detected is present at the input $W(t)$.

The expected or predicted vector $\overline{UP}_m$ is then subtracted from the actual measured vector $\overline{U}_m$ at subtraction node 36 to result in a complex valued error vector $\overline{E}$. As depicted at multiplier 38, this error vector is multiplied by its complex conjugate to result in the absolute value of the error vector squared for that particular sample time $t_m$. A running average is then calculated by multiplying this incremental error value by the factor $\beta$ at multiplier 40 and adding the result at summing node 42 to the earlier accumulated average error (preferably reduced by some factor $\alpha$ at multiplier 44). The resultant average error is then compared by comparator 46 with a pre-established threshold signal T to derive a tone detect flag at the output of the comparator. The tone detect flag can be used to control a modem receiver "turn off" switch 48—or it can simply be used to cause an interrupt of the ongoing program execution in the microprocessor circuits 22 and a branch to an appropriate receiver turn off segment of the program. Alternatively, the tone detect flag at the output of comparator 46 might be used to simply set a flag in the data memory portion of the microprocessor circuits 22 which is thereafter accessed by the microprocessor program on some regular or interrupt basis to control turn off of the modem receiver output.

Figure 3:
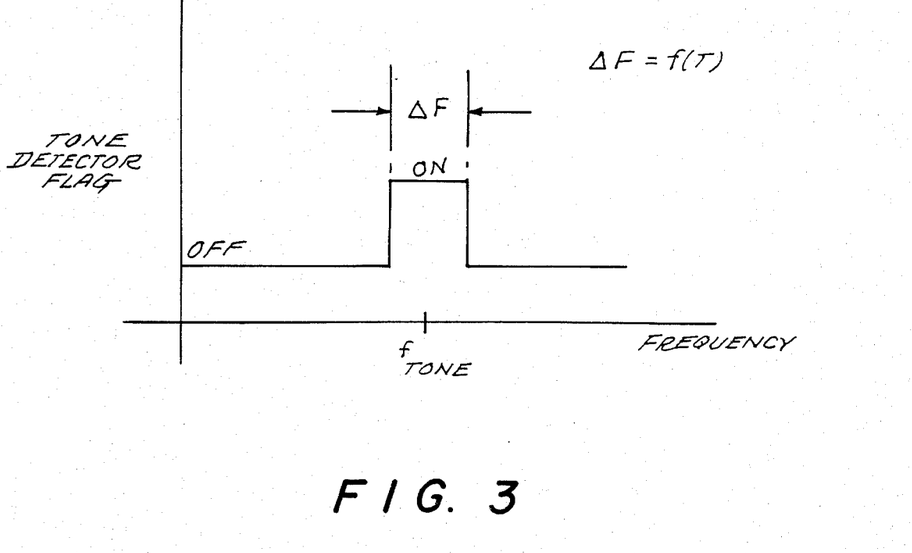
FIG. 3 is a graph depicting tone detector flag values in the exemplary embodiment as a function of the threshold signal T in the embodiment of FIG. 2.

The status of the tone detector flag as a function of frequency is graphically depicted in FIG. 3. As shown, the flag is turned "on" in response to input frequencies within a relatively small bandwidth (e.g. ±10 Hz) centered to about the sinusoidal tone which it is desired to detect. In effect, the circuit provides a notch filter with the notch width being a function of the predetermined threshold signal T and/or the error calculating and/or averaging process as should now be apparent to those skilled in the art.

Figure 4:
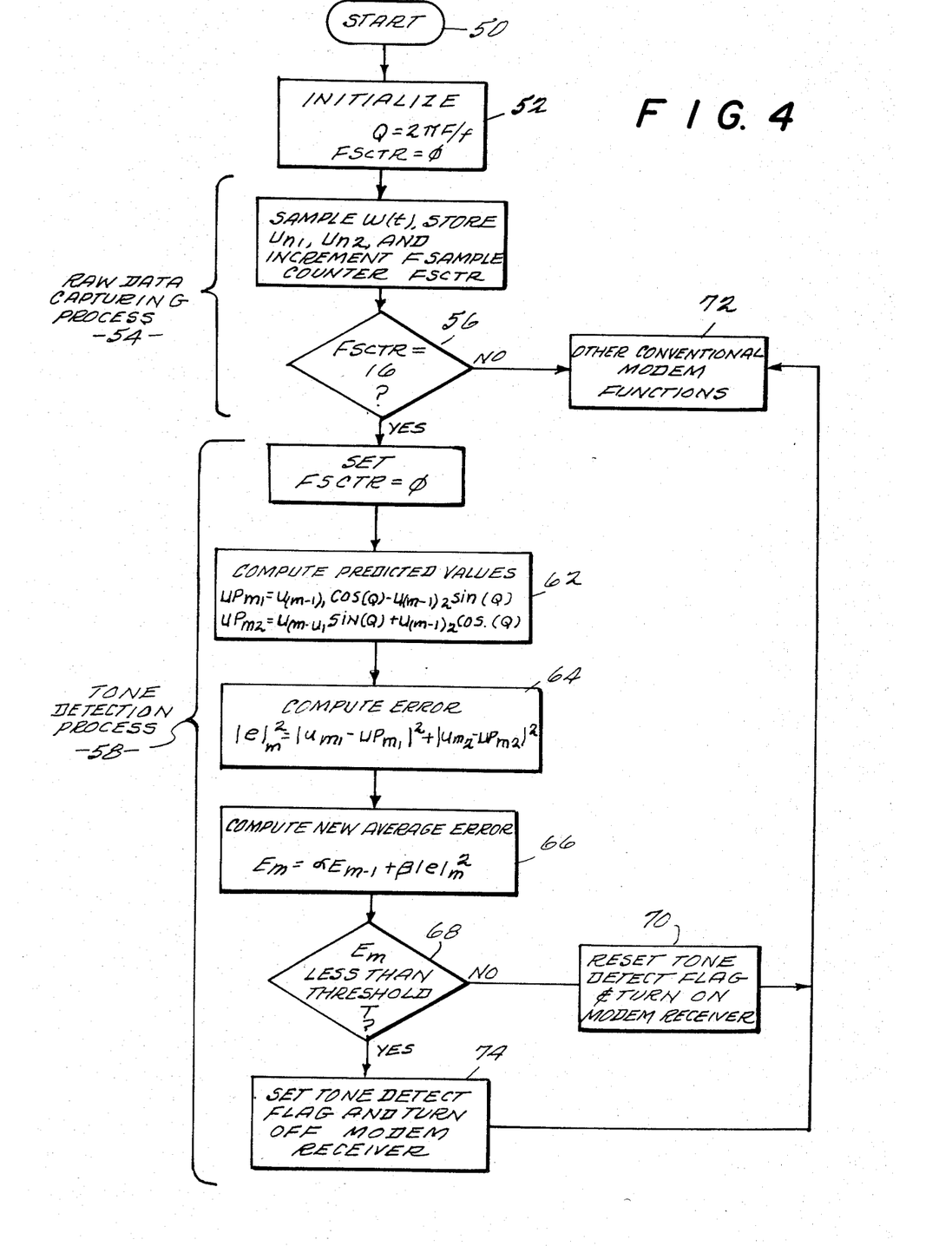
FIG. 4 is an exemplary simplified flow chart of a possible computer program segment that could be embodied in the microprocessor-based modem of FIG. 2 to practice this invention.

Actually, the presently preferred exemplary embodiment achieves the desired tone detection function by including an additional small program segment in the microprocessor circuits 22 which already have access to the contents of data storage register 30. A simplified exemplary depiction of one possible program segment for achieving this desired result is shown at FIG. 4. Here, after the usual start or program entry at 50, initialization steps may be taken at 52 if needed. For the purpose of explaining this brief subroutine or program segment, it is noted in FIG. 4 that, among other things, initialization would include the setting of a counter n to 0 and the definition of the fixed quantity Q as a function of the sampling frequency $f_2$ and the tone frequency to be detected (this latter constant might well be permanently stored in ROM). Although other conventional modem housekeeping functions might also be performed immediately after the depicted initialization steps 52, for the purposes of understanding this invention, the program segment depicted in FIG. 4 immediately enters a conventional segment 54 illustrating capture of the sample raw input data and other conventional ongoing modem functions. It will be appreciated that in a typical actual modem environment, this function may be performed on a timed interrupt basis or by a separate microprocessor or by hardwired sampling/storing circuits so as to continuously perform the sampling and data storage functions which keep the data storage register 30 filled with the most recent sampled vector values $\overline{U}_n$ of the input electrical signal.

As illustrated in FIG. 4 at 56, the exemplary embodiment contemplates entry of the tone detection process 58 once for each 16th data sample. For example, the predicted vector component values $UP_{m1}$ and $UP_{m2}$ are computed at 62 in accordance with the above formulas and as depicted in FIG. 4 based upon the constant Q and the actual measured values for the just earlier sample $U_{(m-1)1}$ and $U_{(m-1)2}$. Thereafter, the absolute value of the error between the predicted and actual vector values at sample time $t_m$ is computed at 64 as is the new average error value $E_m$ at 66. This average error is then compared at 68 against a preset threshold value T. If the average error is not less than the threshold value, then it is ensured that the tone detect flag is properly reset and the modem receiver turned "on" at step 70 before control is returned to the other conventional modem functions at 72. On the other hand, if the average error has fallen below the threshold T, then the tone detect flag is set at step 74 and the modem receiver is turned "off" before control is returned to other conventional modem functions at 72.

Referring to Equation 10, it has been discovered that under certain situations, it may be possible to use only one or the other components of the complex vectors $\overline{UP}_m$ and $\overline{U}_m$ in these calculations. For example, if a 1,004 Hz tone is to be detected and the sampling rate is at 2,400 Hz, it may only be necessary to perform the above calculations using the real or the imaginary portion of the complex valued vectors. However, when the same 2,400 Hz sampling rate is used to detect a 1,700 Hz tone, then it may be necessary to use both the real and imaginary component values of the vectors in the tone detection calculation process as set forth above. The possible need for the use of both the real and imaginary parts of the vector may be lessened if the sampling rate is sufficiently increased or other precautions are taken.

One limitation of the exemplary tone detection process is shown on the simulations attached as Appendices II and III. As will be seen there, the digital filter spectrum repeats such that it responds to all tones which are multiples of the sampling frequency away from the predetermined tone to be detected. Thus, there will be a response from the filter not only at the desired tone frequency F, but also at $F \pm f_2$, at $F \pm 2f_2$ . . . or, indeed, at $F \pm nf_2$ where n is any integer. However, this limitation is an acceptable one for many applications and, in particular, it has been found to be an acceptable limitation for the application of turning off a modem receiver when a pure test tone is present, etc.

The specific technique of calculating and accumulating average error depicted in the exemplary embodiment is not believed to be too critical. For example, instead of calculating the squared absolute value of the error, the absolute difference might be taken without squaring. This latter technique is especially possible where only one of the components of the complex valued vectors are used in the error calculation and, of course, there are many possible ways in which to obtain a running average of the calculated error for comparison to the threshold.

In the exemplary embodiment, the just previous sample $\overline{U}_{m-1}$ is used in calculating the predicted vector value $\overline{UP}_m$ as earlier mentioned. Thus, only two adjacent samples are needed in the exemplary embodiment to perform each incremental tone detection process. And, the tone detection process itself is carried out at a much slower rate than the sampling rate so that only a few of the stored samples are actually utilized in the tone detection process (the remaining samples are, of course, present and utilized for other conventional modem data processing purposes).

It should also be appreciated that there may be considerable variation in the times at which the tone detection process is executed (e.g. it does not have to be done on a regular or periodic basis). And there may be considerable variation in the particular sampled values that are utilized for predicting the expected actual input value at some later time if it is assumed that some particular predetermined and predictable waveshape is present.

Although only a few exemplary embodiments have been described above in detail, those skilled in the art will appreciate that there are many possible variations and modifications that may be made in these exemplary embodiments while yet retaining many of the advantages and novel features of this invention. Accordingly, all such modifications and variations are intended to be included within the scope of the appended claims.

---

APPENDIX I
TO U.S. PAT. APPLICATION OF VEDA KRISHNAN
ENTITLED TEST TONE DETECTOR APPARATUS AND
METHOD AND MODEM USING SAME

```
MORE?     ?
Print which file? : TANK12.BAS
10    INPUT 'TONE,SAMPLING FREQ.,# OF SAMPLES,USE RATIO',T1,F1,N,M
15    N=N*M
20    P=4*ATN(1)*2*T1/F1
25    INPUT 'START,STEP,STOP FREQUENCIES?', N1,N2,N3
30    C=COS(P)
35    S=SIN(P)
40    T=N1-N2
45    GOTO 150
50    P=8*ATN(1)*T/F1
55    D1=0
56    D2=0
57    B=0
60    FOR I=1 TO N STEP M
70    B1=ABS(COS(P*I+B)-C*COS(P*(I-1)+B)+S*SIN(P*(I-1)+B))
72    B2=ABS(SIN(P*I+B)-S*COS(P*(I-1)+B)-C*SIN(P*(I-1)+B))
75    B3=B1**2+B2**2
80    D1=63*D1/64+B3
85    D2=D2+B3
90    NEXT I
105   PRINT T,D1,D2
110   RETURN
150   N4=(N3-N1)/N2+1
152   PRINT 'FREQUENCY      AVG. ERROR      ACC. ERROR'
154   FOR J=1 TO N4
155   T=T+N2
160   GOSUB 50
165   NEXT J
170   T=T1-10
175   GOSUB 50
180   T=T1
185   GOSUB 50
190   T=T1+10
195   GOSUB 50
200   INPUT 'MORE?',Y
210   IF Y=1 THEN GOTO 10
220   STOP
```

---

APPENDIX II
TO U.S. PAT. APPLICATION OF VEDA KRISHNAN
ENTITLED TEST TONE DETECTOR APPARATUS AND
METHOD AND MODEM USING SAME

MORE?    ? 1
TONE,SAMPLING FREQ.,# OF SAMPLES,USE RATIO    ? 1004,2400,64,16
START,STEP,STOP FREQUENCIES?    ? 304,100,4004

| FREQUENCY | AVG. ERROR | ACC. ERROR |
|---|---|---|
| 304 | 102.319 | 161.129 |
| 404 | 81.2813 | 128 |
| 504 | 60.2447 | 94.8716 |
| 604 | 40.6392 | 63.9977 |
| 704 | 23.8068 | 37.4903 |
| 804 | 10.8896 | 17.1487 |
| 904 | 2.76959 | 4.36149 |
| 1004 | .187069E-06 | .236748E-06 |
| 1104 | 2.76959 | 4.36147 |
| 1204 | 10.8896 | 17.1485 |
| 1304 | 23.8072 | 37.4913 |
| 1404 | 40.6409 | 64.0002 |
| 1504 | 60.2447 | 94.8716 |
| 1604 | 81.2808 | 127.999 |
| 1704 | 102.317 | 161.127 |
| 1804 | 121.923 | 192 |

-continued

APPENDIX II
TO U.S. PAT. APPLICATION OF VEDA KRISHNAN
ENTITLED TEST TONE DETECTOR APPARATUS AND
METHOD AND MODEM USING SAME

MORE?  ? 1
TONE,SAMPLING FREQ.,# OF SAMPLES,USE RATIO   ? 1004,2400,64,16
START,STEP,STOP FREQUENCIES?   ? 304,100,4004

| FREQUENCY | AVG. ERROR | ACC. ERROR |
|---|---|---|
| 1904 | 138.756 | 218.509 |
| 2004 | 151.677 | 238.856 |
| 2104 | 159.794 | 251.639 |
| 2204 | 162.563 | 256 |
| 2304 | 159.794 | 251.638 |
| 2404 | 151.673 | 238.851 |
| 2504 | 138.758 | 218.511 |
| 2604 | 121.924 | 192.002 |
| 2704 | 102.327 | 161.137 |
| 2804 | 81.2804 | 127.999 |
| 2904 | 60.2449 | 94.8719 |
| 3004 | 40.6409 | 63.9999 |
| 3104 | 23.8074 | 37.4905 |
| 3204 | 10.8884 | 17.1474 |
| 3304 | 2.7698 | 4.36164 |
| 3404 | .141262E-05 | .148506E-05 |
| 3504 | 2.76896 | 4.36034 |
| 3604 | 10.889 | 17.1479 |
| 3704 | 23.8039 | 37.4869 |
| 3804 | 40.6391 | 63.9972 |
| 3904 | 60.2449 | 94.871 |
| 4004 | 81.2807 | 127.999 |
| 994 | .027865 | .438797E-01 |
| 1004 | .187069E-06 | .236748E-06 |
| 1014 | .278542E-01 | .438583E-01 |

APPENDIX III
TO U.S. PAT. APPLICATION OF VEDA KRISHNAN
ENTITLED TEST TONE DETECTOR APPARATUS AND
METHOD AND MODEM USING SAME

MORE?  ? 1
TONE,SAMPLING FREQ.,# OF SAMPLES,USE RATIO   ? 1700,2400,64,16
START,STEP,STOP FREQUENCIES?   ? 200,100,4200

| FREQUENCY | AVG. ERROR | ACC. ERROR |
|---|---|---|
| 200 | 138.757 | 218.51 |
| 300 | 151.674 | 238.851 |
| 400 | 159.794 | 251.638 |
| 500 | 162.563 | 256 |
| 600 | 159.794 | 251.639 |
| 700 | 151.673 | 238.85 |
| 800 | 138.757 | 218.51 |
| 900 | 121.923 | 192.001 |
| 1000 | 102.319 | 161.129 |
| 1100 | 81.2817 | 128 |
| 1200 | 60.2447 | 94.8715 |
| 1300 | 40.6408 | 64 |
| 1400 | 23.8041 | 37.4869 |
| 1500 | 10.8898 | 17.149 |
| 1600 | 2.76981 | 4.36175 |
| 1700 | .372799E-06 | .502518E-06 |
| 1800 | 2.76911 | 4.36077 |
| 1900 | 10.89 | 17.1492 |
| 2000 | 23.8063 | 37.4895 |
| 2100 | 40.6356 | 63.9944 |
| 2200 | 60.2446 | 94.8716 |
| 2300 | 81.2819 | 128 |
| 2400 | 102.319 | 161.128 |
| 2500 | 121.922 | 191.998 |
| 2600 | 138.757 | 218.51 |
| 2700 | 151.674 | 238.852 |
| 2800 | 159.796 | 251.641 |
| 2900 | 162.563 | 256 |
| 3000 | 159.794 | 251.639 |
| 3100 | 151.674 | 238.852 |
| 3200 | 138.758 | 218.511 |
| 3300 | 121.923 | 192.002 |
| 3400 | 102.317 | 161.127 |
| 3500 | 81.2842 | 128.003 |
| 3600 | 60.2482 | 94.8765 |
| 3700 | 40.6427 | 64.0023 |

-continued

APPENDIX III
TO U.S. PAT. APPLICATION OF VEDA KRISHNAN
ENTITLED TEST TONE DETECTOR APPARATUS AND
METHOD AND MODEM USING SAME

```
MORE?            ? 1
TONE,SAMPLING FREQ.,# OF SAMPLES,USE RATIO    ? 1700,2400,64,16
START,STEP,STOP FREQUENCIES?       ? 200,100,4200
```

| FREQUENCY | AVG. ERROR | ACC. ERROR |
|---|---|---|
| 3800 | 23.8061 | 37.4892 |
| 3900 | 10.889 | 17.1484 |
| 4000 | 2.77 | 4.3621 |
| 4100 | .404783E-05 | .491848E-05 |
| 4200 | 2.76645 | 4.35818 |
| 1690 | .278788E-01 | .438911E-01 |
| 1700 | .372799E-06 | .502518E-06 |
| 1710 | .278823E-01 | .438906E-01 |

What is claimed is:

1. An electrical signal detector for detecting the presence of a predetermined electrical signal having a predetermined and predictable wave-shape, said detector comprising:

digitizing means for repetitively sampling an input electrical signal U for providing a series of digital actual sample signals $U_n$, $U_{n+1}$, $U_{n+2}$ ... each representing the actual value of said input electrical signal $U_n$ at respectively corresponding sampling times $t_n$, $t_{n+1}$, $t_{n+2}$ ... ;

prediction means for producing a series of digitized predicted sample signals $UP_m$, $UP_{m+1}$, $UP_{m+2}$ ... each representing the predicted value $UP_q$ of said predetermined electrical signal at a respectively corresponding sampling time $t_q$ using as input the digitized actual sample signals $U_{q-1}$ associated with a prior occurring sampling time $t_{q-1}$;

comparison means for comparing the predicted sample signals $UP_m$ with the actual sample signals $U_m$ for respectivly corresponding times $t_m$ and for producing error signals $E_m$ related to the differences therebetween;

error accumulation means for producing an average error signal $E_{av}$ using as input said error signals $E_m$;

detection means for comparing said average error signal $E_{av}$ to predetermined threshold signal T and for producing a detected signal output in response thereto;

said predetermined electrical signal being a single frequency F sinusoid and wherein said digitized means and said prediction means jointly operate to generate predictions at times $t_m$ which recur at intervals substantially greater than the digitizing sampling interval $t_n$ corresponding to the higher sampling frequency f; and said digitizing means including a phase-splitter means for producing a pair of digitized sample signals $U_{n1}$, $U_{n2}$ for each $U_n$, said pair of signals representing the quadrature-phase components of a complex valued vector $U_n$ such that $U_n = U_{n1} + jU_{n2}$ and wherein said prediction means includes means for computing the next excepted $U_{(n+1)1}$ and $U_{(n+1)2}$ values in accordance with the following relationships:

$$U_{(n+1)1} = U_{n1} \cos(2\pi F/f) - U_{n2} \sin(2\pi F/f)$$

$$U_{(n+1)2} = U_{n1} \sin(2\pi F/f) + U_{n2} \cos(2\pi F/f).$$

2. A digital data modem having a receiver and a signal detector as in claim 1 and further comprising switch means for disabling said receiver in the presence of said detected signal output.

3. A pure tone signal detector comprising:

a phase-splitter connected to receive an incoming electrical signal and to produce pairs of successive output electrical signals $U_{n1}$, $U_{n2}$ which represent the phase quadrature components of the incoming signal at successive sampling time intervals $t_n$; and digital signal storage and processing means connected to receive the successive digital sample signals $U_{n1}$, $U_{n2}$ and, based thereon, to produce predicted digital signals having values which are expected to occur at future sample times if the incoming signal is a single frequency sinusoid, to compare the respectively corresponding actual and predicted digital signals and to provide a tone detection output based on the difference between said actual and predicted signals.

4. A pure tone signal detector as in claim 3 wherein said successive sampling times $t_n$ occur at a first rate and wherein said predicted digital signals are produced at a second rate lower than said first rate.

5. A method for detecting the presence of a predetermined electrical signal having a predetermined and predictable wave-shape, said method comprising the steps of:

repetitively sampling an input electrical signal U and generating a series of digital actual sample signals $U_n$, $U_{n+1}$, $U_{n+2}$ ... each representing the actual value of said input electrical signal $U_n$ at respectively corresponding sampling times $t_n$, $t_{n+1}$, $t_{n+2}$ ... ;

generating a series of digitized predicted sample signals $UP_m$, $UP_{m+1}$, $UP_{m+2}$ ... each representing the predicted value $UP_q$ of said predetermined electrical signal at a respectively corresponding sampling time $t_q$ using as input the digitized actual sample signals $U_{q-1}$ associated with a prior occurring sampling time $t_{q-1}$;

comparing the predicted sample signals $UP_m$ with the actual sample signals $U_m$ for respectively corresponding times $t_m$ and generating error signals $E_m$ related to the differences therebetween;

generating an average error signal $E_{av}$ using as input said error signals $E_m$;

comparing said averaged error signal $E_{av}$ to a predetermined thresh hold signal T and generating a detected signal output in response thereto;

said predetermined electrical signal being a single frequency F sinusoid and wherein said repetitive sampling and said generating steps are jointly performed to generate predictions at times $t_m$ which recur at intervals substantially greater than the sampling interval $t_n$ corresponding to the higher sampling frequency f; and repetitive sampling step including generating a pair of digitalized sample signals $U_{n1}$, $U_{n2}$ for each $U_n$, said pair of signals representing the quadrature-phase components of a complex valued vector $U_n$ such that $U_n = U_{n1} + jU_{n2}$ and wherein said generating step includes generating the next expected $U_{(n+1)1}$ and $U_{(n+1)2}$ values in accordance with the following relationships:

$$U_{(n+1)1} = U_{n1} \cos(2\pi F/f) - U_{n2} \sin(2\pi F/f)$$

$$U_{(n+1)2} = U_{n1} \sin(2\pi F/f) + U_{n2} \cos(2\pi F/f).$$

6. A method for controlling digital data modem having a receiver and using a signal detecting method as in claim 5 and further comprising the step of disabling said receiver in the presence of said detected signal output.

7. A method of detecting a pure tone signal, said method comprising:

generating pairs of successive output electrical signals $U_{n1}$, $U_{n2}$ which represent the phase quadrature components of an incoming signal at successive sampling time intervals $t_n$;

generating predicted digital signals based on said sample signals $U_{n1}$, $U_{n2}$ and having values which are expected to occur at future sample times if the incoming signal is a single frequency sinusoid; and comparing the respectively corresponding actual and predicted digital signals to generate a tone detection output based on the difference between said actual and predicted signals.

8. A method as in claim 7 wherein said successive sampling times $t_n$ occur at a first rate and wherein said predicted digital signals are produced at a second rate lower than said first rate.

* * * * *